(12) United States Patent
Joanicot et al.

(10) Patent No.: US 7,153,894 B2
(45) Date of Patent: Dec. 26, 2006

(54) PHASE-SEPARATED COMPOSITION COMPRISING TWO MISCIBLE SOLVENTS, AND USE THEREOF IN A PROCESS FOR MAKING CAPSULES

(75) Inventors: Mathieu Joanicot, Chatenay-Malabry (FR); Galder Cristobal, Cambridge, MA (US); Maria Ruela Talingting, Burlington, NJ (US); Jean-Francois Berret, Princeton, NJ (US)

(73) Assignee: Rhodia Chimie, Aubervilliers (FR)

( * ) Notice: Subject to any disclaimer, the term of this patent is extended or adjusted under 35 U.S.C. 154(b) by 229 days.

(21) Appl. No.: 10/458,173

(22) Filed: Jun. 10, 2003

(65) Prior Publication Data
US 2004/0014849 A1    Jan. 22, 2004

(51) Int. Cl.
*B01J 13/02*    (2006.01)
*B01J 13/06*    (2006.01)
*B01J 13/12*    (2006.01)

(52) U.S. Cl. ............... 523/332; 523/340; 428/402.22; 428/402.21; 428/402.2

(58) Field of Classification Search ............ 428/402.2, 428/402.21, 802.22, 802.2; 523/332, 340; 524/560, 577, 539
See application file for complete search history.

(56) References Cited

U.S. PATENT DOCUMENTS 6,350,812 B1    2/2002   Vert et al. ................. 524/845
6,844,377 B1 *  1/2005   Auweter et al. ........... 523/223
6,884,438 B1 *  4/2005   Quintanar et al. .......... 424/490
6,916,488 B1 *  7/2005   Meier et al. ............... 424/450
2004/0010060 A1 1/2004  Joanicot et al. ........... 523/201

FOREIGN PATENT DOCUMENTS

| EP | 1277465 | 1/2003 |
| WO | WO 99/04766 A1 * | 2/1999 |
| WO | WO 03/078049 | 9/2003 |

OTHER PUBLICATIONS

Yu, Y.; Zhang, L.; Eisenberg, A. Macromolecules 1998, 31, 1144-1154.*

* cited by examiner

*Primary Examiner*—David W. Wu
*Assistant Examiner*—Rip A. Lee

(57) ABSTRACT

The invention relates phase-separated compositions comprising two miscible solvents. More specifically, the invention relates to compositions comprising liquid droplets of an internal phase comprising a solvent B and further compounds, said droplets being dispersed in an external phase comprising solvent A, wherein solvent A and solvent B are miscible. Such compositions find use in various technical fields, including encapsulation, vectorisation, protection of compounds, separations, and chemical reactions in a dispersed medium.

7 Claims, No Drawings

PHASE-SEPARATED COMPOSITION COMPRISING TWO MISCIBLE SOLVENTS, AND USE THEREOF IN A PROCESS FOR MAKING CAPSULES

BACKGROUND OF THE INVENTION

The invention relates phase-separated compositions comprising two miscible solvents. More specifically, the invention relates to compositions comprising liquid droplets of an internal phase comprising a solvent B and further compounds, said droplets being dispersed in an external phase comprising solvent A, wherein solvent A and solvent B are miscible. Such compositions find use in various technical fields, including encapsulation, vectorisation, protection of compounds, separations, and chemical reactions in a dispersed medium.

The invention also relates to a process for making capsules, or even multiple capsules, wherein such a composition is used. This process is simple, cost effective, and/or offers a new solution for encapsulating, vectorising, or protecting some compounds.

Various kinds of dispersions of objects in a liquid medium have been used for years. Various kinds of dispersions of objects in a liquid medium have been described in references. Dispersions of solid particles of various sizes in water are often referred to as particle dispersions or colloidal dispersions. Dispersions of droplets of a first liquid phase in a second liquid external phase, wherein the two phases are not miscible, are usually referred to as emulsions (if energy is added) or microemulsions (if the system is at a thermodynamical equilibrium). Use of dispersing agents or stabilizing agents, such as surfactants or amphiphilic copolymers, is known.

Dispersions of objects such as capsules are also known. Capsules are objets comprising a shell either empty or comprising inside at least one internal phase and/or additive (core). Examples of capsules dispersions include dispersions in water of vesicles comprising a core being an aqueous phase, and a shell being a membrane consisting of two organized layers of amphiphilic compounds comprising a hydrophilic moiety and a hydrophobic moiety. In vesicles, the hydrophobic moiety of one of the layers faces the hydrophobic moiety of the other layer.

The dispersions as described above find use in many fields. Examples include encapsulation, vectorisation and/or protection of compounds, for said compounds to be released, protected, and/or provided in an incompatible environment. Examples include also chemical transformations in a phase separated system, inside a dispersed object or at an interface. Examples include also separations of compounds and/or recovery of compounds. There is a need in enriching the art with dispersions comprising different phases and optionally further compounds, in different concentrations. There is also a need in providing products for reinforcement, strengthening, and/or modifications of mechanical properties of materials, such as elastomers or thermoplastics.

In preparing dispersions, multiblock copolymers have proved to be useful. Recent references teach the use of diblock copolymers for making vesicles. For example Discher et al. describe using polyphenyleneoxide-polyethyletylene $[EO]_{40}$-$[EE]_{37}$ block copolymers, in SCIENCE, may 1999, page 1143. They teach that using block copolymers allows controlling some properties of the membrane, such as mechanical properties. Yu et al. in Langmuir, 1999, 15, 7157–7167 describe using polystyrene-polyethyleneoxide block copolymers, and controlling the membrane structure. Shen et al. in J. Phys. Chem. B 1999, 103. 9473–9487 describe using polystyrene-polyacrylic acid $[Styrene]_{310}$-$[AA]_{52}$ block copolymers. Using polystyrene-polyacrylic acid block copolymers is also described by Yu et al. in Macromolecules, Vol 31, 1144–1154. Vesicles may be obtained by thin film rehydratation, or by adding water to a block copolymer dispersed in a solvent (self-formation). Vesicle structures are useful to encapsulate hydrophilic compounds.

In completely different objectives, it has been taught that two miscible solvents can phase separate by adding a polymer. However, such a phase separation does not result in a stable dispersion, and a collapse occurs.

BRIEF SUMMARY OF THE INVENTION

The invention relates to new dispersion structures that enrich the art of dispersions and open a wide range of applications. Thus the invention relates to a composition comprising at least two miscible solvents, solvent A and solvent B, wherein the composition comprises liquid droplets of an internal phase dispersed in an external liquid phase, the droplets of the internal phase comprising:
  solvent B,
  a multiblock copolymer comprising at least two blocks, block A and block B, wherein:
    block A is soluble in solvent A and in solvent B,
    block B is soluble in solvent B, and
    block B is not soluble in solvent A,
  optionally, solvent A, and
  at least one additional compound being:
    a linear polymer H, soluble in solvent B, and not soluble in solvent A, and/or
    an additive being an active ingredient to be protected, vectorized or released with control, a reactive compound to be transformed by a chemical reaction, or a compound to be removed from a liquid phase,
the external liquid phase comprising solvent A, optionally solvent B, and optionally an additive as mentioned above,
provided that the weight ratio (solvent B)/(solvent A+solvent B) in the droplets of the internal phase is greater than the weight ratio (solvent B)/(solvent A+solvent B) in the external phase.

In another aspect, the invention relates to a process for preparing capsules wherein a said composition is used. The process involves reducing the ratio (solvent B)/(solvent A+solvent B), or removing solvent B, for example by adding solvent A.

In another aspect, the invention relates to a solution useful for preparing the composition, and therefore also useful for preparing capsules.

DETAILED DESCRIPTION OF THE INVENTION

Definitions

In the present specification, the molecular weight of a polymer, copolymer or block refers to the weight-average molecular weight of said polymer, copolymer or block. The weight-average molecular weight of the polymer or copolymer can be measured by gel permeation chromatography (GPC). In the present specification, the molecular weight of a block refers to the molecular weight calculated from the amounts of monomers, polymers, initiators and/or transfer agents used to make the said block. The one skilled in the art knows how to calculate these molecular weights. The ratios by weight between blocks refer to the ratios between the amounts of the compounds used to make said blocks, considering an extensive polymerization.

Typically, the molecular weight M of a block is calculated according to the following formula:

$$M = \sum_i M_i * \frac{n_i}{n_{precursor}},$$

wherein $M_i$ is the molecular weight of a monomer i, $n_i$ is the number of moles of a monomer i, and $n_{precursor}$ is the number of moles of a compound the macromolecular chain of the block will be linked to. Said compound may be a transfer agent or a transfer group, or a previous block. If it is a previous block, the number of moles may be considered as the number of moles of a compound the macromolecular chain of said previous block has been linked to, for example a transfer agent or a transfer group. It may be also obtained by a calculation from a measured value of the molecular weight of said previous block. If two blocks are simultaneously grown from a previous block, at both ends, the molecular weight calculated according to the above formula should be divided by two.

In the present specification, a unit deriving from a monomer is understood as a unit that may be directly obtained from the said monomer by polymerizing. Thus, a unit deriving from an ester of acrylic or methacrylic acid does not encompass a unit of formula —CH—CH(COOH)—, —CH—C(CH$_3$)(COOH)—, —CH—CH(OH)—, —CH—C(CH$_3$)(OH)—, obtained for example by polymerizing an ester of acrylic or methacrylic acid, or a vinyl acetate, and then hydrolyzing. A unit deriving from acrylic acid or methacrylic acid encompasses for example a unit obtained by polymerizing a monomer (for example an alkyl acrylate or methacylate) and then reacting (for example hydrolyzing) to obtain units of formula CH—CH(COOH)— or —CH—C(CH$_3$)(COOH)—. A unit deriving from vinyl alcohol encompasses for example a unit obtained by polymerizing a monomer (for example a vinyl ester) and then reacting (for example hydrolyzing) to obtain units of formula —CH—CH(OH)— or —CH—C(CH$_3$)(OH)—.

Structure of the Composition, Capsules Obtained Therefrom

The composition according to the invention is a dispersion of droplets in an external phase. The external phase comprises solvent A, which is preferably water, and optionally solvent B. Usually it comprises both. The droplets comprise solvent B, and other compounds: the multiblock copolymer, optionally some solvent A, and the additive compound. The amount by weight of solvent B, relative to the amount of solvent A together with solvent B, in the droplets, is higher than the amount of solvent B in the external phase.

The composition is preferably at a thermodynamical equilibrium, with exchange and rearrangement of compounds at the interface of the droplets, and between the phases. Conditions to have such an equilibrium usually depend on the solvents, and the multiblock copolymer (amounts, chemical structures . . . ). Upon removal, or partial removal, of solvent B, the equilibrium is broken, and a frozen structure is obtained. The droplets, when frozen, form capsules comprising a shell. Without intending to be bound to any theory, it is believed that the shell comprises the multiblock copolymer and optionally polymer H. Block B and optionally polymer H, are not soluble in solvent A when solvent B is removed. It is believed that they precipitate to form the shell. The step of removing or partially removing solvent B is also referred to as a quenching step. Removing, partially removing or quenching encompasses diluting with solvent A, or adding solvent A, as the concentration of solvent B decreases when performing such a dilution or addition.

The composition may comprise an additive, dispersed or dissolved in the droplets, and optionally also in the external liquid phase. When the droplets are frozen, the additive is trapped inside the shell, and may participate in forming a core inside the shell. The capsules usually comprise inside the shell an aqueous phase, if solvent A is water. Said aqueous phase may comprise an additive. If there is no additive, the shell forms an empty capsule useful for example for reinforcement of materials, for example for making light materials. Empty capsules may also encompass capsules comprising an aqueous phase inside the shell.

Solvents

Solvent A and solvent B are miscible. By miscible, it is meant that they do not phase separate when mixed, without the multiblock copolymer or the polymer H. Relative amounts of solvent A and solvent B in the composition are such as solvent A and solvent B would not phase separate without the multiblock copolymer or the polymer H. Examples of miscible solvents useful for the invention include the following:

Water as solvent A and ethanol as solvent B, and
Water as solvent A and THF as solvent B.

Multiblock Copolymer

By multiblock copolymer, it is meant a copolymer comprising at least two different blocks, block A and block B, linked together. The multiblock copolymer may be linear sequenced copolymer, for example a di-block or a triblock copolymer. It may be a star-shaped copolymer, for example a block copolymer comprising a core and branches, wherein the core comprises one of the block, and the branches comprising the other block. It may be a grafted copolymer, comprising a backbone and grafts linked to the backbone, wherein the backbone comprises one of the block, and the branches comprising the other block. It is further mentioned that the core, the backbone, the branches, and/or the grafts may be copolymers (random or block copolymers). Blocks may also be random copolymers. Examples of preferred linear sequences block copolymer are (block A)-(block B) diblock copolymers, (block A)-(block B)-(block A) triblock copolymers, and (block B)-(block A)-(block B) triblock copolymers.

By linear polymer, it is meant a linear homopolymer, or a linear random copolymer, as opposed to a multiblock copolymer.

A block is usually defined by repeating units it comprises. A block may be a copolymer, comprising several kind of repeating units, deriving form several monomers. Hence, block A and block B are different polymers, deriving from different monomers, but they may comprise some common repeating units (copolymers). Block A and block B preferably do not comprise more than 50% of a common repeating unit (derived from the same monomer).

Block A is soluble in solvent A and in solvent B. Block B is soluble in solvent B, and block B is not soluble in solvent A. Polymer H is soluble in solvent B, and is not soluble in solvent A.

By block, polymer, or copolymer soluble in a solvent, it is meant that the block, polymer or copolymer does not phase separate macroscopically in said solvent at a concentration from 0,01% and 10% by weight, at a temperature from 20° C. to 30° C. By block, polymer, or copolymer non soluble in a solvent, it is meant that the block, polymer or copolymer does phase separate macroscopically in said solvent at a concentration from 0,01% and 10% by weight, at a temperature from 20° C. to 30° C. Solubility of a block refers to the solubility said block would have without the other block, that is the solubility of a polymer consisting of the same repeating units than said block, having the same molecular weight.

In a preferred embodiment, wherein solvent A is water, block A is hydrophilic and block B is hydrophobic. Hydrophilic or Hydrophobic properties of a block refer to the property said block would have without the other block, that is the property of a polymer consisting of the same repeating units than said block, having the same molecular weight. By hydrophilic block, polymer or copolymer, it is meant that the block, polymer or copolymer does not phase separate macroscopically in water at a concentration from 0,01% and 10% by weight, at a temperature from 20° C. to 30° C. By hydrophobic block, polymer or copolymer, it is meant that the block, polymer or copolymer does phase separate macroscopically in the same conditions.

It is further mentioned that the multiblock copolymer may be soluble in water, ethanol, THF, and/or in a hydrophobic compound.

Preferably, block B comprises repeating units deriving from monomers selected from the group consisting of:
propylene oxide,
alkylesters of an alpha-ethylenically-unsaturated, preferably mono-alpha-ethylenically-unsaturated, monocarboxylic acid, such as methylacrylate, ethylacrylate, n-propylacrylate, n-butylacrylate, methylmethacrylate, ethylmethacrylate, n-propylmethacrylate, n-butylmethacrylate, and 2-ethyl-hexyl acrylate, 2-ethyl-hexyl methacrylate, isooctyl acrylate, isooctyl methacrylate, lauryl acrylate, lauryl methacrylate,
vinyl Versatate,
acrylonitrile,
vinyl nitriles, comprising from 3 to 12 carbon atoms,
vinylamine amides, and
vinylaromatic compounds such as styrene.

Preferably, block A comprises repeating units deriving from monomers selected from the group consisting of:
ethylene oxide,
vinyl alcohol,
vinyl pyrrolidone,
acrylamide, methacrylamide,
polyethylene oxide (meth)acrylate (i.e. polyethoxylated (meth)acrylic acid),
hydroxyalkylesters of alpha-ethylenically-unsaturated, preferably mono-alpha-ethylenically-unsaturated, monocarboxylic acids, such as 2-hydroxyethylacrylate, and
hydroxyalkylamides of alpha-ethylenically-unsaturated, preferably mono-alpha-ethylenically-unsaturated, monocarboxylic acids,
dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;
ethylenimine, vinylamine, 2-vinylpyridine, 4-vinylpyridine;
trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy)ethyltrimethylammonium, TMAEAMS) chloride, trimethylammonium ethyl (meth)acrylate (also called 2-(acryloxy)ethyltrimethylammonium, TMAEAMS) methyl sulphate, trimethyl ammonium propyl (meth)acrylamido chloride, vinylbenzyl trimethyl ammonium chloride,
diallyldimethyl ammonium chloride,
monomers having the following formula:

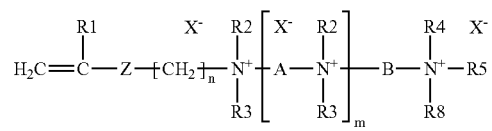

wherein
R$_1$ is a hydrogen atom or a methyl or ethyl group;
R$_2$, R$_3$, R$_4$, R$_5$ and R$_6$, which are identical or different, are linear or branched C$_1$–C$_6$, preferably C$_1$–C$_4$, alkyl, hydroxyalkyl or aminoalkyl groups;
m is an integer from 1 to 10, for example 1;
n is an integer from 1 to 6, preferably 2 to 4;
Z represents a —C(O)O— or —C(O)NH— group or an oxygen atom;
A represents a (CH$_2$)$_p$ group, p being an integer from 1 to 6, preferably from 2 to 4;
B represents a linear or branched C$_2$–C$_{12}$, advantageously C$_3$–C$_6$, polymethylene chain optionally interrupted by one or more heteroatoms or heterogroups, in particular O or NH, and optionally substituted by one or more hydroxyl or amino groups, preferably hydroxyl groups;
alpha-ethylenically-unsaturated, preferably mono-alpha-ethylenically-unsaturated, monomers comprising a phosphate or phosphonate group,
alpha-ethylenically-unsaturated, preferably mono-alpha-ethylenically-unsaturated, monocarboxylic acids, such as acrylic acid, methacrylic acid
monoalkylesters of alpha-ethylenically-unsaturated, preferably mono-alpha-ethylenically-unsaturated, dicarboxylic acids,
monoalkylamides of alpha-ethylenically-unsaturated, preferably mono-alpha-ethylenically-unsaturated, dicarboxylic acids,
alpha-ethylenically-unsaturated, preferably mono-alpha-ethylenically-unsaturated, compounds comprising a sulphonic acid group, and salts of alpha-ethylenically-unsaturated, preferably mono-alpha-ethylenically-unsaturated, compounds comprising a sulphonic acid group, such as vinyl sulphonic acid, salts of vinyl sulfonic acid, vinylbenzene sulphonic acid, salts of vinylbenzene sulphonic acid, alpha-acrylamidomethylpropanesulphonic acid, salts of alpha-acrylamidomethylpropanesulphonic acid 2-sulphoethyl methacrylate, salts of 2-sulphoethyl methacrylate, acrylamido-2-methylpropanesulphonic acid (AMPS), salts of acrylamido-2-methylpropanesulphonic acid, and styrenesulfonate (SS).

Block A more preferably comprises units deriving from monomers selected from the group consisting of:
acrylic acid, methacrylic acid,
acrylamide, methacrylamide,
vinyl sulphonic acid, salts of vinyl sulfonic acid,
vinylbenzene sulphonic acid, salts of vinylbenzene sulphonic acid,
alpha-acrylamidomethylpropanesulphonic acid, salts of alpha-acrylamidomethylpropanesulphonic acid 2-sulphoethyl methacrylate, salts of 2-sulphoethyl methacrylate,
acrylamido-2-methylpropanesulphonic acid (AMPS), salts of acrylamido-2-methylpropanesulphonic acid, and styrenesulphonate (SS).

While block B is usually a neutral block, block A might be discriminated as regard to its electrical behavior or nature. It means that block A may be a neutral block, or a polyionic block (a polyanionic block, or a polycationic block). It is further mentioned the electrical behavior or nature (neutral, polyanionic or polycationic) may depend on the pH of the emulsion. By polyionic it is meant that the block comprises ionic (anionic or cationic) repetitive units whatever the pH, or that the block comprises repetitive units that may be neutral or ionic (anionic or cationic) depending on the pH of the emulsion (the units are potentially ionic). A unit that may be neutral or ionic (anionic or cationic), depending on the pH of the composition, will be thereafter referred as an ionic unit (anionic or cationic), or as a unit deriving from an ionic monomer (anionic or cationic), whatever it is in a neutral form or in an ionic form (anionic or cationic).

Examples of polycationic blocks are blocks comprising units deriving from cationic monomers such as:
aminoalkyl (meth)acrylates, aminoalkyl (meth)acrylamides, monomers, including particularly (meth)acrylates, and (meth)acrylamides derivatives, comprising at least one secondary, tertiary or quaternary amine function, or a heterocyclic group containing a nitrogen atom, vinylamine or ethylenimine;
diallyldialkyl ammonium salts;
their mixtures, their salts, and macromonomers deriving from therefrom.

Examples of cationic monomers include:
dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;
ethylenimine, vinylamine, 2-vinylpyridine, 4-vinylpyridine;
trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy)ethyltrimethylammonium, TMAE-AMS) chloride, trimethylammonium ethyl (meth)acrylate (also called 2-(acryloxy)ethyltrimethylammonium, TMAEAMS) methyl sulphate, trimethyl ammonium propyl (meth)acrylamido chloride, vinylbenzyl trimethyl ammonium chloride,
diallyldimethyl ammonium chloride,
monomers having the following formula:

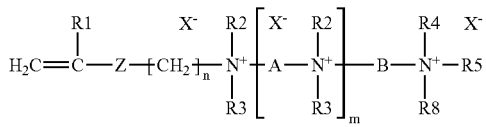

wherein
$R_1$ is a hydrogen atom or a methyl or ethyl group;
$R_2$, $R_3$, $R_4$, $R_5$ and $R_6$, which are identical or different, are linear or branched $C_1$–$C_6$, preferably $C_1$–$C_4$, alkyl, hydroxyalkyl or aminoalkyl groups;
m is an integer from 1 to 10, for example 1;
n is an integer from 1 to 6, preferably 2 to 4;
Z represents a —C(O)O— or —C(O)NH— group or an oxygen atom;
A represents a $(CH_2)_p$ group, p being an integer from 1 to 6, preferably from 2 to 4;
B represents a linear or branched $C_2$–$C_{12}$, advantageously $C_3$–$C_6$, polymethylene chain optionally interrupted by one or more heteroatoms or heterogroups, in particular O or NH, and optionally substituted by one or more hydroxyl or amino groups, preferably hydroxyl groups;
X, which are identical or different, represent counterions, and
their mixtures, and macromonomers deriving therefrom.

Examples of anionic blocks are blocks comprising units deriving from anionic monomers selected from the group consisting of:
alpha-ethylenically-unsaturated, preferably mono-alpha-ethylenically-unsaturated, monomers comprising a phosphate or phosphonate group,
alpha-ethylenically-unsaturated, preferably mono-alpha-ethylenically-unsaturated, monocarboxylic acids,
monoalkylesters of alpha-ethylenically-unsaturated, preferably mono-alpha-ethylenically-unsaturated, dicarboxylic acids,
monoalkylamides of alpha-ethylenically-unsaturated, preferably mono-alpha-ethylenically-unsaturated, dicarboxylic acids,
alpha-ethylenically-unsaturated, preferably mono-alpha-ethylenically-unsaturated, compounds comprising a sulphonic acid group, and salts of alpha-ethylenically-unsaturated compounds comprising a sulphonic acid group.

Preferred anionic blocks include blocks comprising deriving from at least one anionic monomer selected from the group consisting of:
acrylic acid, methacrylic acid,
vinyl sulphonic acid, salts of vinyl sulfonic acid,
vinylbenzene sulphonic acid, salts of vinylbenzene sulphonic acid,
alpha-acrylamidomethylpropanesulphonic acid, salts of alpha-acrylamidomethylpropanesulphonic acid
2-sulphoethyl methacrylate, salts of 2-sulphoethyl methacrylate,
acrylamido-2-methylpropanesulphonic acid (AMPS), salts of acrylamido-2-methylpropanesulphonic acid, and
styrenesulfonate (SS).

Examples of neutral blocks (block A or block B) are blocks comprising units deriving from at least one monomer selected from the group consisting of:
acrylamide, methacrylamide,
amides of alpha-ethylenically-unsaturated, preferably mono-alpha-ethylenically-unsaturated, monocarboxylic acids,
esters of an alpha-ethylenically-unsaturated, preferably mono-alpha-ethylenically-unsaturated, monocarboxylic acid, for example alkyl esters such as such as methylacrylate, ethylacrylate, n-propylacrylate, n-butylacrylate, methylmethacrylate, ethylmethacrylate, n-propylmethacrylate, n-butylmethacrylate, 2-ethyl-hexyl acrylate, or hydroxyalkyl esters such as 2-hydroxyethylacrylate,
polyethylene and/or polyporpylene oxide (meth)acrylates (i.e. polyethoxylated and/or polypropoxylated (meth)acrylic acid),
vinyl alcohol,
vinyl pyrrolidone,
vinyl acetate, vinyl Versatate, vinyl nitriles, preferably comprising from 3 to 12 carbon atoms,
acrylonitrile,
vinylamine amides,
vinyl aromatic compounds, such as styrene, and
mixtures thereof.

Block A preferably derives from mono-alpha-ethylenically unsaturated monomers. Block B preferably derives from mono-alpha-ethylenically unsaturated monomers. In a preferred embodiment, both block A and block B derive from mono-alpha-ethylenically unsaturated monomers. More precisely, it is meant that for block A and/or block B, at least 50% of the repeating units preferably are mono-alpha-ethylenically-unsaturated monomers derived units.

The monomers listed above are mono-alpha-unsaturated monomers, except propylene oxide and ethylene oxide.

In a preferred embodiment, the hydrophobic block (block B) comprises units deriving from butyl-(meth)acrylate, the hydrophilic block (block A) comprises units deriving from (meth)acrylic-acid, and polymer H, if comprised in the composition, comprises units deriving from (meth)butyl-acrylate. These multiblock copolymers are soluble in ethanol and in THF. Solvent B is preferably ethanol or THF. The multiblock copolymer is preferably a diblock (Block A)-(Block B) copolymer.

In another preferred embodiment, the hydrophobic block (block B) comprises units deriving from styrene, the hydrophilic block (block A) comprises units deriving from (meth) acrylic-acid, and polymer H, if comprised in the composition, comprises units deriving from styrene. These multiblock copolymers are soluble in THF. Solvent B is preferably THF. The multiblock copolymer is preferably a diblock (Block A)-(Block B) copolymer.

In embodiments wherein the hydrophilic block (block A) comprises units deriving from (meth)acrylic-acid block, pH is preferably of lower than or equal to 4. At such a low pH the units deriving from (meth)acrylic-acid are usually in an anionic form.

The weight-average molecular weight of the multiblock copolymer is preferably comprised between 1000 and 100000 g/mol. It is more preferably comprised between 2000 and 20000 g/mol. Within these ranges, the weight ratio of each block may vary. It is however preferred that each block have a molecular weight above 500 g/mol, and preferably above 1000 g/mol. Within these ranges, the weight ratio between block(s) A and block(s) B is preferably of at least 50/50.

Examples of useful multiblock copolymers are copolymers wherein block B is a hydrophobic block comprising units deriving from butyl-(meth)acrylate, block A is a hydrophilic block comprising units deriving from (meth)acrylic-acid, preferably linear sequenced (block A)-(block B) diblock copolymers, (block A)-(block B)-(block A) triblock copolymers, or (block B)-(block A)-(block B) triblock copolymers. Examples include (block A)-(block B) diblock copolymers wherein block B has a molecular weight of 3 k, and block A has a molecular weight of 12 k (ratio between block(s) A and block(s) B of 80/20). Examples also include (block A)-(block B) diblock copolymers wherein block B has a molecular weight of 8 k, and block A has a molecular weight of 8 k (ratio between block(s) A and block(s) B of 50/50).

Examples of useful multiblock copolymers are copolymers wherein block B is a hydrophobic block comprising units deriving from styrene, block A is a hydrophilic block comprising units deriving from (meth)acrylic-acid, preferably linear sequenced (block A)-(block B) diblock copolymers, (block A)-(block B)-(block A) triblock copolymers, or (block B)-(block A)-(block B) triblock copolymers. Examples include (block A)-(block B) diblock copolymers wherein block B has a molecular weight of 8 k, and block A has a molecular weight of 8 k (ratio between block(s) A and block(s) B of 50/50).

There are several methods for making block copolymers. Some methods for making such copolymers are provided below.

It is possible for example to use anionic polymerization with sequential addition of 2 monomers as described for example by Schmolka, J. Am. Oil Chem. Soc. 1977, 54, 110; or alternatively Wilczek-Veraet et al., Macromolecules 1996, 29, 4036. Another method which can be used consists in initiating the polymerization of a block polymer at each of the ends of another block polymer as described for example by Katayose and Kataoka, Proc. Intern. Symp. Control. Rel. Bioact. Materials, 1996, 23, 899.

In the context of the present invention, it is recommended to use living or controlled polymerization as defined by Quirk and Lee (Polymer International 27, 359 (1992)). Indeed, this particular method makes it possible to prepare polymers with a narrow dispersity and in which the length and the composition of the blocks are controlled by the stoichiometry and the degree of conversion. In the context of this type of polymerization, there are more particularly recommended the copolymers which can be obtained by any so-called living or controlled polymerization method such as, for example:

free-radical polymerization controlled by xanthates according to the teaching of Application WO 98/58974 and U.S. Pat. No. 6,153,705, free-radical polymerization controlled by dithioesters according to the teaching of Application WO 98/01478, free-radical polymerization controlled by dithioesters according to the teaching of Application WO 99/35178, free-radical polymerization controlled by dithiocarbamates according to the teaching of Application WO 99/35177, free-polymerization using nitroxide precursors according to the teaching of Application WO 99/03894, free-radical polymerization controlled by dithiocarbamates according to the teaching of Application WO 99/31144, free-radical polymerization controlled by dithiocarbazates according to the teaching of Application WO 02/26836, free-radical polymerization controlled by halogenated Xanthates according to the teaching of Application WO 00/75207 and U.S. application Ser. No. 09/980,387, free-radical polymerization controlled by dithiophosphoroesters according to the teaching of Application WO 02/10223, free-radical polymerization controlled by a transfer agent in the presence of a disulphur compound according to the teaching of Application WO 02/22688, atom transfer radical polymerization (ATRP) according to the teaching of Application WO 96/30421, free-radical polymerization controlled by iniferters according to the teaching of Otu et al., Makromol. Chem. Rapid. Commun., 3, 127 (1982), free-radical polymerization controlled by degenerative transfer of iodine according to the teaching of Tatemoto et al., Jap. 50, 127, 991 (1975), Daikin Kogyo Co Ltd Japan, and Matyjaszewski et al., Macromolecules, 28, 2093 (1995), group transfer polymerization according to the teaching of Webster O. W., "Group Transfer Polymerization", p. 580–588, in the "Encyclopedia of Polymer Science and Engineering", Vol. 7, edited by H. F. Mark, N. M. Bikales, C. G. Overberger and G. Menges, Wiley Interscience, New York, 1987, radical polymerization controlled by tetraphenylethane derivatives (D. Braun et al., Macromol. Symp., 111, 63 (1996)), radical polymerization controlled by organocobalt complexes (Wayland et al., J. Am. Chem. Soc., 116, 7973 (1994)).

Preferred processes are sequenced living free-radical polymerization processes, involving the use of a transfer agent. Preferred transfer agents are agents comprising a group of formula —S—C(S)—Y—, —S—C(S)—S—, or —S—P(S)—Y—, or —S—P(S)—S—, wherein Y is an atom different from sulfur, such as an oxygen atom, a nitrogen atom, and a carbon atom. They include dithioester groups, thioether-thione groups, dithiocarbamate groups, dithiphosphoroesters, dithiocarbazates, and xanthate groups. Examples of groups comprised in preferred transfer agents include groups of formula —S—C(S)—NR—NR'$_2$, —S—C(S)—NR—N=CR'$_2$, —S—C(S)—O—R, —S—C(S)—CR=CR'$_2$, and —S—C(S)—X, wherein R and R' are or identical or different hydrogen atoms, or organic groups such as hydrocarbyl groups, optionally substituted, optionally comprising heteroatoms, and X is an halogen atom. A preferred polymerization process is a living radical polymerization using xanthates.

Copolymers obtained by a living or controlled free-radical polymerization process may comprise at least one transfer agent group at an end of the polymer chain. In particular embodiment such a group is removed or deactivated.

For example, a "living" or "controlled" radical polymerization process used to make the di-block copolymers comprises the steps of:

a) reacting a mono-alpha-ethylenically-unsaturated monomer, at least a free radicals source compound, and a transfer agent, to obtain a first block, the transfer agent being bounded to said first block, b) reacting the first block, another mono-alpha-ethylenically-unsaturated monomer, and, optionally, at least a radical source compound, to obtain a di-block copolymer, and then c) optionally, reacting the transfer agent with means to render it inactive.

During step a), a first block of the polymer is synthesized. During step b), b1), or b2), another block of the polymer is synthesized.

Examples of transfer agents are transfer agents of the following formula (I):

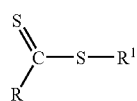

(I)

wherein:

R represents an R$^2$O—, R$^2$R'$^2$N— or R$^3$— group, R$^2$ and R'$^2$, which are identical or different, representing (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, R$^3$ representing H, Cl, an alkyl, aryl, alkene or alkyne group, an optionally substituted, saturated or unsaturated (hetero)cycle, an alkylthio, alkoxycarbonyl, aryloxycarbonyl, carboxyl, acyloxy, carbamoyl, cyano, dialkyl- or diarylphosphonato, or dialkyl- or diarylphosphinato group, or a polymer chain, R$^1$ represents (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and The R$^1$, R$^2$, R'$^2$ and R$^3$ groups can be substituted by substituted phenyl or alkyl groups, substituted aromatic groups or the following groups: oxo, alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, isocyanato, phthalimido, maleimido, succinimido, amidino, guanidino, hydroxyl (—OH), amino (—NR$_2$), halogen, allyl, epoxy, alkoxy (—OR), S-alkyl, S-aryl or silyl, groups exhibiting a hydrophilic or ionic nature, such as alkaline salts of carboxylic acids or alkaline salts of sulphonic acid, poly(alkylene oxide) (PEO, PPO) chains, or cationic substituents (quaternary ammonium salts), R representing an alkyl or aryl group.

Preferably, the transfer agent of formula (I) is a dithiocarbonate chosen from the compounds of following formulae (IA), (IB) and (IC):

(IA)

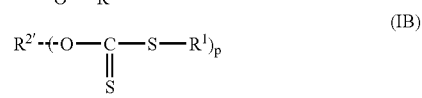

(IB)

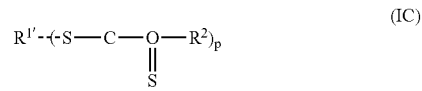

(IC)

wherein:

R$^2$ and R$^{2'}$ represent (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, R$^1$ and R$^{1'}$ represent (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and p is between 2 and 10.

Other examples of transfer agents are transfer agents of the following formulae (II) and (III):

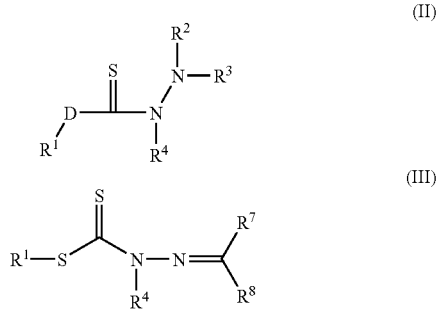

wherein
R¹ is an organic group, for example a group R¹ as defined above for tranfer agents of formulae (I), (IA), (IB), and (IC),
R², R³, R⁴, R⁷, and R⁸ which are identical or different are hydrogen atoms or organic groups, optionally forming rings. Examples of R², R³, R⁴, R⁷, and R⁸ organic groups include hydrocarbyls, subsituted hydrocabyls, heteroatom-containing hydrocarbyls, and substututed heteroatom-containing hydrocarbyls.

The mono-alpha-ethylenically-unsaturated monomers and their proportions are chosen in order to obtain the desire properties for the block(s). According to this process, if all the successive polymerizations are carried out in the same reactor, it is generally preferable for all the monomers used during one stage to have been consumed before the polymerization of the following stage begins, therefore before the new monomers are introduced. However, it may happen that monomers of the preceding stage are still present in the reactor during the polymerization of the following block. In this case, these monomers generally do not represent more than 5 mol % of all the monomers.

The polymerization can be carried out in an aqueous and/or organic solvent medium. The polymerization can also be carried out in a substantially neat melted form (bulk polymerization), or according to a latex type process in an aqueous medium.

Polymer H

Polymer H is preferably a hydrophobic polymer. Hydrophobic is understood as defined above. The capsules obtained from the compositions having polymer H usually have interesting properties, including higher encapsulation rates, or a strengthen shell. Having such a strengthened shell allows easier formulation by preventing destruction when processing, or allows controlled release (long lasting). Hydrophobic polymers include polymers comprising repeating units deriving from monomers listed above for block B.

In a preferred embodiment block B and polymer H are the same. It means that they comprise units deriving from the same monomers. Thus, in an preferred embodiment the hydrophilic block (block B) and polymer H are polybutylacrylate, polybutylmethacrylate or styrene. They may have the same or different molecular weights. According to this preferred embodiment, the polymer H has a weight-average molecular weight of between 500 g/mol and 15000 g/mol.

In a particular embodiment, polymer H has a glass transition temperature of greater than 50° C., preferably of greater than 100° C. Polystyrene is an example. Capsules obtained form compositions comprising such a polymer H present a shell with interesting mechanical properties. It makes it possible to make empty capsules for reinforcement of materials, for example for making light materials. It allows also making pigment or ink capsules.

For a given amount of polymer H is the composition, the more multiblock copolymer is comprised in the composition (in the droplets), the smaller the size of the droplets is. Controlling the size of the droplets, allows controlling the size of the capsules made therefrom, and thus may allows controlling efficiency of encapsulation of an active.

Actives

The composition according to the invention, and the capsules deriving therefrom may comprise an additive being an active ingredient to be protected, vectorized or released with control, a reactive compound to be transformed by a chemical reaction, or a compound to be removed from a liquid phase.

Reactive compounds are for example compounds to be polymerized in the droplets of the composition. Compounds to be removed are for example compounds soluble in solvent B, to be remove from solvent A by a liquid-liquid separation process.

The capsules may be comprised in a composition that may be introduced in an animal or human body, applied onto a surface such as skin, hair, a fabric, a hard surface, or spread in a field. Active ingredients are compounds comprised in the composition to be delivered, quickly or slowly, suddenly, for example by breaking the shell, or progressively for example by diffusing through the shell, in the destination environment. Thus, the capsules may comprise actives useful in cosmetic compositions, drug compositions, perfumes, agrochemical compositions.

Active ingredients that may be comprised in the composition and/or in the capsules deriving therefrom, include organic and inorganic compounds. Inorganic compounds are for example inorganic particles, such as nanoparticles, said particles having optionally a surface treatment for controlling their compatibility and/or dispersion, in solvent B and/or in polymer H.

The actives ingredients may be hydrophobic compounds, or may be comprised in a hydrophobic compound, for example comprised in polymer H.

Examples of actives being the hydrophobic compound, or being comprising therein, that may be used in food industry include actives used in food industry include mono-, di- and triglycerides, essential oils, aromas, and food compatible coloring agents.

Examples of actives being the hydrophobic compound, or being comprising therein, that may be used in cosmetics include fragrances, perfumes, silicone oils, such as dimethicones, lipophilic vitamins such as A vitamin.

Examples of actives being the hydrophobic compound, or being comprising therein, that may be used in paints, include alkydes resins, epoxy resins, (poly)isocyanates masked or not masked.

Examples of actives being the hydrophobic compound, or being comprising therein, that may be used in paper industry include alkylcetene dimer (AKD), and alkenyl succinic anhydride (ASA).

Examples of actives being the hydrophobic compound, or being comprising therein, that may be used in agrochemicals include α-cyano-phenoxybenzyl carboxylates, α-cyano-halogénophénoxy-carboxylates, N-méthylcarbonates comprisong aromatic groups, Aldrin, Azinphos-methyl, Benfluralin, Bifenthrin, Chlorphoxim, Chlorpyrifos, Fluchloralin, Fluroxypyr, Dichlorvos, Malathion, Molinate, Parathion, Permethrin, Profenofos, Propiconazole, Prothiofos, Pyrifenox, Butachlor, Metolachlor, Chlorimephos, Diazinon, Fluazifop-P-butyl, Heptopargil, Mecarbam, Propargite, Prosulfocarb, Bromophos-ethyl, Carbophenothion, and Cyhalothrin.

Examples of actives being the hydrophobic compound, or being comprising therein, that may be used in detergency compositions include silicone antifoaming agents, fragrances and perfumes biocide agents, fragrances and perfumes.

Examples of actives being the hydrophobic compound, or being comprising therein, also include organic solvents or mixtures thereof, such as solvent used for cleaning or stripping such as aromatic oil cuts, terpenic compounds such as D- or L-limonenes, and solvents such as Solvesso®. Solvents also include aliphatic esters such as methyl esters of a mixture of acetic acid, succinic acid, glutaric acid (mixture of Nylon monomer preparation by-products), and chlorinated solvents.

The actives ingredients may be hydrophilic compounds, miscible or dispersible in solvent A and optionally B, comprised in the capsules, and optionally also out of the capsules.

Examples of actives include hydrophilic actives that may be introduced in a classical vesicle, known by the one skilled in the art.

Examples of actives include hydrophilic actives that may be used in cosmetics, including compounds having a cosmetic effect, a therapeutic effect, and compounds used for treating hair or skin.

Thus, active compounds that may be used include hair and skin conditioning agents, such as polymers comprising quaternary ammonium groups, optionally comprised in heterocycles (quaternium or polyquaternium type compounds), moisturizing agents, fixing (styling) agents, more preferably fixing polymers such as homo-, co-, or ter-polymers, for example acrylamide, acrylamide/sodium acrylate, sulfonated polystyrene, cationic polymers, polyvinylpyrrolidone, polyvinyl acetate.

Examples of hydrophilic actives include coloring agents, astringents, that may be used in deodorizing compositions, such as aluminum salts, zirconium salts, antibacterial agents, anti-inflammatory agents, anesthetizing agents, solar filter agents.

Examples of actives include hydrophilic actives that may be used in cosmetics, for example α- and β-hydroxyacids, such as citric-acid, lactic acid, glycolic acid, salicylic acid, cicarboxylic acids, preferably unsaturated ones comprising from 9 to 16 carbon atoms, such as azelaic acid, C vitamin and drivatives thereof, particularly phophate-based or glycosyl-based derivatives, biocidal agents, such as preferably cationic ones (for example Glokill PQ, Rhodoaquat RP50, marketed by Rhodia).

Examples of actives include hydrophilic actives that may be used in food industry, for example divalent calcium salts (phosphates, chlorides . . . ), that may be used for cross-linking texturing polymers such as alginates, carraghenans. Sodium bicarbonate may also be used.

Examples of actives include hydrophilic actives that may be used in agrochemicals, including hydrophilic pesticides and pesticides hydrophilic nutritive ingredients.

Examples of actives include hydrophilic actives that may be used in oil fields, including hydrophilic compounds useful for cementing, drilling, or stimulating oil wells (for example par fracturing). Examples include cross-linking catalysts such as lithium salts, chlorides, acetate. Examples also include compounds that degrade polysaccharides, such as carboxylic acids (for example citric acid), enzymes, and oxidizing agents.

Examples of actives include actives that may be used in paper industry, including calcium chloride, and hydrochloric acid.

Examples of actives also include bleaches, to be protected from oxidation by agents in laundry detergent formulations, enzymes, phosphate salts and cationic compounds having a biocide action.

Examples of actives include also cationic surfactants used for fabric care. Capsules make it possible to avoid contact of such surfactants with anionic surfactants usually comprised in laundry detergent formulation, and makes it possible to make two in one formulations having a detergent action and a fabric care action.

Examples of useful actives also include biocides such as:
Tolcide (Tetrakishydroxymethylphosphonium sulfate, THPS),
benzyldimethyldodecylammonium chloride (BDAC),
cetrimonim bromide (CTAB), for example a compound marketed as Rhodaquat M-242.

Examples of useful actives also include enzymes such as serine class proteases, for example elastase.

Composition

In an advantageous composition solvent A is water, block A comprises hydrophilic units, block B comprises hydrophobic units, the weight ratio between the amount of hydrophobic units and the hydrophilic units is of lower than or equal to 50/50, and the amount by weight of multiblock copolymer in the composition is of at least 0,005%, and of less than 20%.

When comprising polymer H, the above advantageous composition, the weight ratio between the amount of hydrophobic units and the hydrophilic units is lower than or equal to 50/50, polymer H comprises hydrophobic units, said units being the same than the units comprised in block B, and the amount by weight of polymer H in the composition is of at least 1%, the amount by weight of the multiblock copolymer together with polymer H, in the composition, being preferably of less than 20%.

In a particular embodiment, the hydrophobic block comprises units deriving from butyl-(meth)acrylate, the hydrophilic block comprises units deriving from (meth)acrylic-acid, and polymer H, if comprised in the composition, comprises units deriving from butyl-(meth)acrylate. Solvent B is then preferably THF or ethanol. If solvent B is ethanol, the ratio by weight (amount of solvent B)/(amount of solvent B+amount of water) in the composition is preferably comprised between 0.7 and 0.8. If solvent B is THF, the ratio by weight (amount of solvent B)/(amount of solvent B+amount of water) in the composition is preferably comprised between 0.3 and 0.7, preferably between 0.4 and 0.7.

In another particular embodiment, the hydrophobic block comprises units deriving from styrene, the hydrophilic block comprises units deriving from (meth)acrylic-acid, and polymer H, if comprised in the composition, comprises units deriving from styrene solvent B is then preferably THF. If solvent B is THF, the ratio by weight (amount of solvent B)/(amount of solvent B+amount of water) in the composition is preferably comprised between 0.7 and 0.9.

Process for Making the Composition and/or the Capsules

The composition according to the invention may be prepared by mixing solvent A, solvent B, the multiblock copolymer, and the additional compound. Mixing may be carried out in any order and may be carried out with using premixes. A useful premix is a solution premix comprising solvent B, the multiblock copolymer and optionally polymer H.

Thus, a composition according to the invention comprising at least two miscible solvents wherein solvent A is water, can be prepared by mixing:
water,
solvent B,
a multiblock copolymer comprising at least two blocks, block A and block B, wherein:
  block A is hydrophilic, soluble in water and in solvent B,
  block B is hydrophobic, soluble in solvent B, and
  block B is not soluble in water, and
at least one additional compound being:
  a linear polymer H, soluble in solvent B, and not soluble in solvent A, and/or
  an additive being an active ingredient to be protected, vectorized or released with control, a reactive compound to be transformed by a chemical reaction, or a compound to be removed from a liquid phase.

More preferably, the composition can be prepared by mixing
water
  optionally, at least one additive being an active ingredient to be protected, vectorized or released with control, a reactive compound to be transformed by a chemical reaction, or a compound to be removed from a liquid phase, said additive being optionally dispersed or dissolved in water, and
  a solution comprising:
    solvent B,
    a multiblock copolymer comprising at least two blocks, block A and block B, wherein:
      block A is hydrophilic, soluble in water and in solvent B,
      block B is hydrophobic, soluble in solvent B, and
      block B is not soluble in water, and
      optionally, a linear polymer H, soluble in solvent B, and not soluble in solvent A,
provided that the obtained composition comprises polymer H and/or the additive.

If solvent B is ethanol, and the multiblock copolymer has a hydrophobic block comprising units deriving from butyl-(meth)acrylate, and a hydrophilic block comprising units deriving from (meth)acrylic-acid, it is preferred that from 0.2 to 0.3 parts by weight of water be mixed for 1 part by weight of water together with solvent B.

If solvent B is THF, and the multiblock copolymer has a hydrophobic block comprising units deriving from butyl-(meth)acrylate, and a hydrophilic block comprising units deriving from (meth)acrylic-acid, it is preferred that from 0.3 to 0.7, preferably 0.3 to 0.6, parts by weight of water be mixed for 1 part by weight of water together with solvent B.

If solvent B is THF, and the multiblock copolymer has a hydrophobic block comprising units deriving from styrene, it is preferred that from 0.1 to 0.3, preferably 0.3 to 0.6, parts by weight of water be mixed for 1 part by weight of water together with solvent B.

In a particular embodiment solvent A is water, and is added, optionally with additives dispersed or dissolved therein, to a solution premix comprising solvent B, the multiblock copolymer, and optionally polymer H.

Different solvents, and multiblock copolymer, and different amounts thereof, may be used, to prepare a useful composition according to the invention, and to prepare then capsules, as long as a phase separation occurs. Some preferred systems have been described above for water/ethanol and water/THF systems, but the invention is not limited to them.

Indeed, a very practical starting product, useful for preparing dispersions, capsules, vesicles, or the like, is a solution, comprising:
a water-miscible solvent B,
a multiblock copolymer comprising at least two blocks, block A and block B, wherein:
  block A is hydrophilic, soluble in water and in the water-miscible solvent,
  block B is hydrophobic, soluble in the water-miscible solvent, and
  block B is not soluble in water,
a linear polymer H, soluble in the water-miscible solvent, and not soluble water, and
optionally, an active ingredient, a reactive compound to be transformed by a chemical reaction, or a compound to be removed from a liquid phase, said ingredient or compound being soluble or dispersible in solvent B, wherein block B and polymer H comprise repetitive units, said repetitive units being the same.

In a particular embodiment of the solution, solvent B is ethanol or THF, block B is a hydrophobic block comprising units deriving from butyl-(meth)acrylate, block A is a hydrophilic block comprising units deriving from (meth)acrylic-acid, and polymer H comprises units deriving from butyl-(meth)acrylate. The block copolymer is preferably a linear sequenced (block A)-(block B) diblock copolymer, (block A)-(block B)-(block A) triblock copolymer, or (block B)-(block A)-(block B) triblock copolymer.

In another particular embodiment of the solution, solvent B is THF, block B is a hydrophobic block comprising units deriving from styrene, block A is a hydrophilic block comprising units deriving from (meth)acrylic-acid, and polymer H comprises units deriving from butyl-(meth)acrylate. The block copolymer is preferably a linear sequenced (block A)-(block B) diblock copolymer, (block A)-(block B)-(block A) triblock copolymer, or (block B)-(block A)-(block B) triblock copolymer.

When block A is a block comprising units deriving from (meth)acrylic-acid, it is preferred that the pH be of lower than or equal to 4 when adding water.

According to an interesting aspect of the invention, the composition is quenched in order to obtain capsules, dispersed in solvent A. The capsules obtained by quenching the composition comprise a shell, either empty or comprising inside at least one internal phase and/or additive. Quenching is performed by removing or partially removing solvent B from the droplets comprised in the composition, comprising at least the miscible solvents, water and solvent B. The capsules obtained are dispersed in solvent A, which is preferably water.

Advantageously, solvent A is water, and removing or partially removing (quenching) is carried out by dilution with water, dialysis, or evaporation, optionally under vacuum, optionally with heating.

In a particular embodiment solvent A is water, the droplets in the composition comprise the additive (such as an active), and the capsules obtained by quenching comprise inside at least the additive.

In another particular embodiment, the droplets of the composition comprise at least two miscible solvents and comprise a polymer H, having a glass transition temperature of greater than 50° C., preferably of greater than 100° C. The capsules obtained have then the shell comprising polymer H.

The shell of the capsules then have a shell with interesting properties, as mentioned above. According to this embodiment, it is possible to make empty capsules for reinforcement of materials, for example for making light materials. It allows also making pigment or ink capsules.

After quenching (removal or partially removal of solvent B), solvent A, for example water, may be removed or partially removed, to obtained dry capsules, substantially dry capsules, or a concentrated dispersions of capsules. Said dry capsules, substantially dry capsules, or a concentrated dispersions of capsules can be re-dispersed in a liquid medium, for example solvent A, preferably water, or re-diluted. They may also be compounded in solid materials.

The capsules might be used in formulations or environments having different pH. For example home-care detergents formulations, or water having the detergent formulation, are usually rather basic. When block A is sensible to pH, as a block comprising units deriving from (meth)acrylic acid usually is, the stability of the capsules obtained after quenching, and the encapsulation rate of actives, can be improved at higher pH, by adding to the dispersion comprising the capsules (dispersion in solvent A) a polymer having cationic units. The polymer might be for example a diblock copolymer comprising an hydrophilic cationic block and an hydrophilic neutral block. Good results can be obtained by using a diblock copolymer having a polyTMAEAMS block and a polyacrylamide block. Good results can also be obtained by using a diblock copolymer having a poly(chloride 2-vinylpyridine) block and a polyethylene oxide block. Using the polymer having cationic units also allows having actives that are pH-sensible. It is thus possible the protect an active that is pH-sensible (incompatibility and/or degradation at pH of higher than 4), in the capsules, from a substantially high pH environment.

The process for preparing the capsules may comprise optional steps. The composition, before quenching, can be heat-treated, for example at temperatures of from 40 to 90° C. Such a heat treatment helps in improving the encapsulation rate of actives. The composition can be extruded, before quenching, through a membrane comprising pores, for example de polycarbonate or a PVDF membrane comprising pores. Such an extrusion step is known by the one skilled in the art of vesicles, for example in pharmaceutical industry for preparation of monodispersed phospholipid-based vesicles. This allows obtaining smaller capsules with a narrower size dispersion. It can also somehow allow strengthening the vesicle membrane. This allows also improving the stability (decreasing aggregation problems for example) of the dispersion comprising the capsules obtained after quenching.

When preparing capsules having an active, the dispersion comprising the capsules, obtained after quenching, can be dialyzed, according to conventional techniques, in order to withdraw actives that have not been encapsulated and/or remaining solvent B.

Some illustrative but non-limiting examples are provided hereunder for the better understanding of the invention.

EXAMPLES

Compounds used:
Diblock copolymer: a polybutylacrylate—polyacrylic acid (PBA-b-PAA) block copolymer, having a weight-average molecular weight of 15,000 g/mol, comprising 50 wt % of the polybutylacrylate block and 50 wt % of the polyacrylic acid block. Solid Form.

Dye: $10^{-5}$ M Alexa Fluor® 594 in water Mw 759, Molecular Probes.
Polymer H: a polybutylacrylate homopolymer having a weight-average molecular weight of 1000 g/mol.
CTAB: cetrimonim bromide, marketed as Rhodaquat M-242.
cationic block copolymer: diblock copolymer having a 11 k polyTMAEAMS block and a 30 k polyacrylamide block.

Example 1

Dye Encapsulation with a Diblock Copolymer 0.45 g 8 k—8 k diblock polymer solids, and 1.05 g 75/25 by wt of a solution ethanol/aqueous dye, are mixed vigorously together. The mixture is then heated at 86° C. At that temperature, a clarification of the mixture occurs. A composition comprising two phases is obtained. It comprises about 20% by weight of copolymer. The composition is then extruded through a filter PVDF 0.2 µm filter. The extruded product is then quenched by dilution by 3 folds its original concentration. Capsules comprising the dye are formed. They are dispersed in a liquid being substantially water, and comprising untrapped dye. The capsules dispersion comprises about 6.7% of diblock copolymer. The untrapped is removed dye by dialyzing through a membrane (MWCO 3 k, regenerated cellulose Slide-a-Lyser dialysis cassette, Pierce), at about pH 2–3 against ~10% ethanol.

Fluorescence measurement is performed using an Hitachi F4500 apparatus, at □excitation=595 nm and □emission=612 nm.

The fluorescence measurement shows that the amount of dye remaining is ca. 30% compared to without dialysis.

Example 2

Dye Encapsulation with a Diblock Copolymer and Polymer H

The same procedure than in Example 1 is carried out, with using:
0.15 g 8 k—8 k diblock copolymer solids
0.075 g 1 k polymer H
1.275 g 75/25 by wt ethanol/aqueous dye.
Before quenching the amount of polymer if about 10%. After quenching the amount of polymer is of about 3.3%.

The fluorescence measurement shows that the amount of dye remaining is ca. 7% compared to without dialysis.

Example 3

CTAB Encapsulation with Diblock at pH 2

A mixture of a solution of 25 wt % CTAB in water, a solution of 40 wt % diblock copolymer ethanol, more ethanol to reach a concentration of CTAB of 6.25 wt %, a concentration of diblock copolymer of 10 wt %, and a ratio ethanol/(ethanol+water) $\phi_{EtOH}$ of 0.75, is prepared. The mixture is then heated to 66° C. and then cool with mixing. A composition comprising two phases is obtained. The composition is then extruded through a filter PVDF 0.2 µm filter. The extruded product is then quenched by dilution by 3 folds its original concentration. Capsules comprising CTAB are formed. They are dispersed in a liquid being substantially water. The dispersion of capsules is then dialyzed as in example 1.

The encapsulation rate of CTAB is of 80%. This amount of trapped CTAB is based on $^1$H-NMR integrations on methyl protons next to the nitrogen.

Example 4

CTAB Encapsulation with Diblock at pH 8–9

A mixture of a solution of 10 wt % CTAB in water with dye ($10^{-5}$M), a solution of 40 wt % diblock copolymer ethanol, more ethanol and water, is prepared to reach a concentration of CTAB of 6.25 wt %, a concentration of diblock copolymer of 10 wt %, and a ratio ethanol/(ethanol+water) $\phi_{EtOH}$ of 0.75, is prepared. The mixture is then heated to 66° C. and then cool with mixing. A composition comprising two phases is obtained. The extruded product is then quenched by dilution by 5 folds its original concentration. Capsules comprising CTAB are formed. They are dispersed in a liquid being substantially water. 0.03% by weight of the cationic diblock copolymer is added. The pH is raised to 8–9. The dispersion of capsules is then dialyzed as in example 1.

The fluorescence measurement shows that the amount of dye remaining is ca. 35% compared to without dialysis.

The invention claimed is:

1. A process for preparing capsules comprising a shell, either empty or comprising inside at least one internal phase and/or additive, comprising the step of:
   removing or partially removing solvent B from droplets comprised in a composition comprising at least two miscible solvents, solvent A and solvent B, wherein the composition comprises liquid droplets of an internal phase dispersed in an external liquid phase,
   the droplets of the internal phase comprising:
      solvent B,
      a multiblock copolymer comprising at least two blocks, block A and block B, wherein:
         block A is soluble in solvent A and in solvent B,
         block B is soluble in solvent B, and
         block B is not soluble in solvent A,
      optionally, solvent A, and
      at least one additional compound being:
         a linear polymer H, soluble in solvent B, and not soluble in solvent A, and/or
         an additive being an active ingredient to be protected, vectorized or released with control, a reactive compound to be transformed by a chemical reaction, or a compound to be removed from a liquid phase,
   the external liquid phase comprising solvent A, optionally solvent B, and optionally an additive as mentioned above,
   provided that the weight ratio (solvent B)/(solvent A+solvent B) in the droplets of the internal phase is greater than the weight ratio (solvent B)/(solvent A+solvent B) in the external phase, to obtain capsules dispersed in solvent A and,
   wherein:
      the droplets in the composition comprising at least two miscible solvents comprise polymer H, and
      polymer H has a glass transition temperature of greater than 50° C., and
      the shell comprise polymer H.

2. A process for preparing capsules comprising a shell, either empty or comprising inside at least one internal phase and/or additive, comprising the step of:
   removing or partially removing solvent B from droplets comprised in a composition comprising at least two miscible solvents, solvent A and solvent B, wherein the composition comprises liquid droplets of an internal phase dispersed in an external liquid phase,
   the droplets of the internal phase comprising:
      solvent B,
      a multiblock copolymer comprising at least two blocks, block A and block B, wherein:
         block A is soluble in solvent A and in solvent B,
         block B is soluble in solvent B, and
         block B is not soluble in solvent A,
      optionally, solvent A, and
      at least one additional compound being:
         a linear polymer H, soluble in solvent B, and not soluble in solvent A, and/or
         an additive being an active ingredient to be protected, vectorized or released with control, a reactive compound to be transformed by a chemical reaction, or a compound to be removed from a liquid phase,
   the external liquid phase comprising solvent A, optionally solvent B, and optionally an additive as mentioned above,
   provided that the weight ratio (solvent B)/(solvent A+solvent B) in the droplets of the internal phase is greater than the weight ratio (solvent B)/(solvent A+solvent B) in the external phase, to obtain capsules dispersed in solvent A, wherein solvent A is water, block A is hydrophilic, and block B is hydrophobic, said composition being prepared by mixing:
   water,
   solvent B,
   a multiblock copolymer comprising at least two blocks, block A and block B,
   at least one additional compound being:
      a linear polymer H, soluble in solvent B, and not soluble in solvent A, and/or
      an additive being an active ingredient to be protected, vectorized or released with control, a reactive compound to be transformed by a chemical reaction, or a compound to be removed from a liquid phase, and,
      wherein the solvent B is ethanol or tetrahydrofuran, the multiblock copolymer having the hydrophobic block comprising units deriving from butyl-(meth)acrylate, the hydrophilic block comprising units deriving from (meth)acrylic-acid, and polymer H, if comprised in the composition, comprising units deriving from butyl-(meth)acrylate, and water and solvent B are mixed in a proportion such that for 1 part by weight of the total of solvent B and water there is 0.2 to 0.3 part by weight of water.

3. The composition according to claim 2, wherein:
   solvent B is ethanol and the external phase comprises a mixture of ethanol and water, or
   solvent B is tetrahydrofuran (THF) and the external phase comprises a mixture of tetrahydrofuran (THF) and water.

4. The process according to claim 2, wherein, block A comprises hydrophilic units, block B comprises hydrophobic units, and the weight ratio between the amount of hydrophobic units and the hydrophilic units is of lower than or equal to 50/50, and comprising polymer H, wherein:
   the weight ratio between the amount of hydrophobic units and the hydrophilic units is of lower than or equal to 50/50, polymer H comprises hydrophobic units, said units being the same than the units comprised in block B, and the amount by weight of polymer H in the composition is of at least 1%.

5. A process for preparing capsules comprising a shell, either empty or comprising inside at least one internal phase and/or additive, comprising the step of:

removing or partially removing solvent B from droplets comprised in a composition comprising at least two miscible solvents, solvent A and solvent B, wherein the composition comprises liquid droplets of an internal phase dispersed in an external liquid phase, the droplets of the internal phase comprising:
solvent B,
a multiblock copolymer comprising at least two blocks, block A and block B, wherein:
block A is soluble in solvent A and in solvent B,
block B is soluble in solvent B, and
block B is not soluble in solvent A,
optionally, solvent A, and
at least one additional compound being:
a linear polymer H, soluble in solvent B, and not soluble in solvent A, and/or
an additive being an active ingredient to be protected, vectorized or released with control, a reactive compound to be transformed by a chemical reaction, or a compound to be removed from a liquid phase,
the external liquid phase comprising solvent A, optionally solvent B, and optionally an additive as mentioned above,
provided that the weight ratio (solvent B)/(solvent A+solvent B) in the droplets of the internal phase is greater than the weight ratio (solvent B)/(solvent A+solvent B) in the external phase, to obtain capsules dispersed in solvent A, wherein solvent A is water, block A is hydrophilic, and block B is hydrophobic, said composition being prepared by mixing:
water,
solvent B,
a multiblock copolymer comprising at least two blocks, block A and block B,
at least one additional compound being:
a linear polymer H, soluble in solvent B, and not soluble in solvent A, and/or
an additive being an active ingredient to be protected, vectorized or released with control, a reactive compound to be transformed by a chemical reaction, or a compound to be removed from a liquid phase, and, wherein the solvent B is THF, the multiblock copolymer having the hydrophobic block comprising units deriving from butyl-(meth)acrylate, the hydrophilic block comprising units deriving from (meth)acrylic-acid, and polymer H, if comprised in the composition, comprising units deriving from butyl-(meth)acrylate, and water and solvent B are mixed in a proportion such that for 1 part by weight of the total of solvent B and water there is 0.3 to 0.7 part by weight of water.

6. A process for preparing capsules comprising a shell, either empty or comprising inside at least one internal phase and/or additive, comprising the step of:

removing or partially removing solvent B from droplets comprised in a composition comprising at least two miscible solvents, solvent A and solvent B, wherein the composition comprises liquid droplets of an internal phase dispersed in an external liquid phase, the droplets of the internal phase comprising:
solvent B,
a multiblock copolymer comprising at least two blocks, block A and block B, wherein:
block A is soluble in solvent A and in solvent B,
block B is soluble in solvent B, and
block B is not soluble in solvent A,
optionally, solvent A, and
at least one additional compound being:
a linear polymer H, soluble in solvent B, and not soluble in solvent A, and/or an additive being an active ingredient to be protected, vectorized or released with control, a reactive compound to be transformed by a chemical reaction, or a compound to be removed from a liquid phase,
the external liquid phase comprising solvent A, optionally solvent B, and optionally an additive as mentioned above,
provided that the weight ratio (solvent B)/(solvent A+solvent B) in the droplets of the internal phase is greater than the weight ratio (solvent B)/(solvent A+solvent B) in the external phase, to obtain capsules dispersed in solvent A, wherein solvent A is water, block A is hydrophilic, and block B is hydrophobic , said composition being prepared by mixing:
water,
solvent B,
a multiblock copolymer comprising at least two blocks, block A and block B,
at least one additional compound being:
a linear polymer H, soluble in solvent B, and not soluble in solvent A, and/or
an additive being an active ingredient to be protected, vectorized or released with control, a reactive compound to be transformed by a chemical reaction, or a compound to be removed from a liquid phase, and, wherein the solvent B is THF, the multiblock copolymer having the hydrophobic block comprising units deriving from styrene, the hydrophilic block comprising units deriving from (meth)acrylic-acid, and polymer H, if comprised in the composition, comprising units deriving from styrene, and water and solvent B are mixed in a proportion such that for 1 part by weight of the total of solvent B and water there is 0.1 to 0.3 part by weight of water.

7. A process for preparing capsules comprising a shell, either empty or comprising inside at least one internal phase and/or additive, comprising the step of:

removing or partially removing solvent B from droplets comprised in a composition comprising at least two miscible solvents, solvent A and solvent B, wherein the composition comprises liquid droplets of an internal phase dispersed in an external liquid phase, the droplets of the internal phase comprising:
solvent B,
a multiblock copolymer comprising at least two blocks, block A and block B, wherein:
block A is soluble in solvent A and in solvent B,
block B is soluble in solvent B, and
block B is not soluble in solvent A,
optionally, solvent A, and
at least one additional compound being:
a linear polymer H, soluble in solvent B, and not soluble in solvent A, and/or
an additive being an active ingredient to be protected, vectorized or released with control, a reactive compound to be transformed by a chemical reaction, or a compound to be removed from a liquid phase, the external liquid phase comprising solvent A, optionally solvent B, and optionally an additive as mentioned above, provided that the weight ratio (solvent B)/(solvent A+solvent B) in the droplets of the internal phase is greater than the weight ratio (solvent B)/(solvent A+solvent B) in the external phase, to obtain capsules dispersed in solvent A, and, comprising the linear copolymer H, wherein block B and polymer H comprise repetitive units, said repetitive units of block B and polymer H being the same.

* * * * *